United States Patent
Miyamoto et al.

(10) Patent No.: US 11,274,830 B2
(45) Date of Patent: Mar. 15, 2022

(54) COMBUSTOR NOZZLE, COMBUSTOR, AND GAS TURBINE

(71) Applicant: Mitsubishi Hitachi Power Systems, Ltd., Kanagawa (JP)

(72) Inventors: Kenji Miyamoto, Tokyo (JP); Kenta Taniguchi, Yokohama (JP); Kei Inoue, Yokohama (JP); Shohei Domen, Yokohama (JP); Yuichi Ichikawa, Tokyo (JP); Satoshi Tanimura, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 79 days.

(21) Appl. No.: 16/491,883

(22) PCT Filed: Mar. 12, 2018

(86) PCT No.: PCT/JP2018/009444
§ 371 (c)(1),
(2) Date: Sep. 6, 2019

(87) PCT Pub. No.: WO2018/168747
PCT Pub. Date: Sep. 20, 2018

(65) Prior Publication Data
US 2020/0033006 A1    Jan. 30, 2020

(30) Foreign Application Priority Data

Mar. 13, 2017 (JP) .............................. JP2017-047575

(51) Int. Cl.
*F23R 3/04* (2006.01)
*F02C 3/04* (2006.01)
(Continued)

(52) U.S. Cl.
CPC ................ *F23R 3/045* (2013.01); *F02C 3/04* (2013.01); *F02C 3/14* (2013.01); *F02C 7/04* (2013.01);
(Continued)

(58) Field of Classification Search
CPC .... F23R 3/045; F23R 3/28; F23R 3/44; F23R 3/36; F02C 3/04; F02C 3/14; F02C 7/04;
(Continued)

(56) References Cited

U.S. PATENT DOCUMENTS 4,704,869 A * 11/1987 Iizuka ..................... F23R 3/54
60/751
5,675,971 A    10/1997 Angel et al.
(Continued)

FOREIGN PATENT DOCUMENTS

CN    103003552    3/2013
CN    103080653    5/2013
(Continued)

OTHER PUBLICATIONS

International Search Report dated May 29, 2018 in International (PCT) Patent Application No. PCT/JP2018/009444, with English translation.
(Continued)

*Primary Examiner* — Steven M Sutherland
(74) *Attorney, Agent, or Firm* — Wenderoth, Lind & Ponack, L.L.P.

(57) ABSTRACT

A combustor nozzle includes a nozzle main body extending along an axis. The nozzle main body includes a first fuel passage which extends along the axis and through which first fuel is configured to flow, a first fuel ejection passage which extends to an outer circumferential surface of the nozzle main body toward a distal end side thereof from the first fuel passage and is configured to eject the first fuel from
(Continued)

the outer circumferential surface, an air flow passage which extends in an axial direction on a radial outer side of the first fuel passage with respect to the axis and through which purge air is configured to flow, and an air ejection passage which extends from the air flow passage toward a center of a distal end of the nozzle main body and is configured eject the purge air from the center of the distal end.

13 Claims, 5 Drawing Sheets

(51) Int. Cl.
  *F02C 3/14* (2006.01)
  *F02C 7/04* (2006.01)
  *F02C 7/22* (2006.01)
  *F23R 3/28* (2006.01)
  *F23R 3/44* (2006.01)

(52) U.S. Cl.
  CPC ............... *F02C 7/222* (2013.01); *F23R 3/28* (2013.01); *F23R 3/44* (2013.01); *F05D 2220/32* (2013.01); *F05D 2240/35* (2013.01)

(58) Field of Classification Search
  CPC ... F02C 7/222; F05D 2220/32; F05D 2240/35
  See application file for complete search history.

(56) References Cited

U.S. PATENT DOCUMENTS

| | | | |
|---|---|---|---|
| 5,680,766 A | 10/1997 | Joshi et al. | |
| 5,778,676 A * | 7/1998 | Joshi | F23D 11/101 239/405 |
| 6,415,594 B1 | 7/2002 | Durbin et al. | |
| 7,065,972 B2 * | 6/2006 | Zupanc | F23R 3/286 60/748 |
| 2002/0014078 A1 | 2/2002 | Mandai et al. | |
| 2010/0192586 A1 | 8/2010 | Terada et al. | |
| 2010/0236252 A1 | 9/2010 | Huth | |
| 2012/0180490 A1 * | 7/2012 | Takami | F23R 3/36 60/740 |
| 2012/0291446 A1 * | 11/2012 | Hirata | F23R 3/286 60/772 |
| 2013/0139511 A1 | 6/2013 | Sometani et al. | |
| 2017/0130962 A1 | 5/2017 | Inoue et al. | |

FOREIGN PATENT DOCUMENTS

| | | |
|---|---|---|
| EP | 2 664 767 | 11/2013 |
| EP | 2 698 582 | 2/2014 |
| JP | 2001-141243 | 5/2001 |
| JP | 2002-31343 | 1/2002 |
| JP | 2005-195284 | 7/2005 |
| JP | 2009-52859 | 3/2009 |
| JP | 5615008 | 10/2014 |
| JP | 2015-183892 | 10/2015 |
| KR | 10-2010-0037630 | 4/2010 |
| WO | 2012/124467 | 9/2012 |

OTHER PUBLICATIONS

Written Opinion of the International Searching Authority dated May 29, 2018 in International (PCT) Patent Application No. PCT/JP2018/009444, with English translation.

* cited by examiner

COMBUSTOR NOZZLE, COMBUSTOR, AND GAS TURBINE

CROSS-REFERENCE TO RELATED APPLICATION

Priority is claimed from Japanese Patent Application No. 2017-047575, filed Mar. 13, 2017, the content of which is incorporated herein by reference.

TECHNICAL FIELD

The present invention relates to a combustor nozzle, a combustor, and a gas turbine.

BACKGROUND ART

In recent years, in combustors of a gas turbine, a premixed combustion method in which fuel is mixed in advance with compressed air (air for combustion) sent from a compressor to generate an air-fuel mixture and the air-fuel mixture is burned has been widely used (see, for example, Japanese Unexamined Patent Application, First Publication No. 2015-183892, hereinafter "JP 2015-183892").

As this type of combustor, one including a second fuel nozzle provided on a central axis of a combustor and a plurality of first fuel nozzles disposed parallel to the second fuel nozzle is known.

In a combustor of a gas turbine in which such a premixed combustion method is employed, backfiring (flashback) in which a flame moves against a flow direction of an air-fuel mixture may occur in an area in which a flow velocity of the air-fuel mixture is low.

JP 2015-183892 discloses a technology for inhibiting the occurrence of flashback by ejecting air from a distal end portion of a first fuel nozzle, thereby decreasing the area in which a flow velocity of an air-fuel mixture is low and decreasing a fuel concentration.

SUMMARY OF INVENTION

Technical Problem

Incidentally, regarding the fuel supplied to a combustor, there are oil fuels as a backup fuel in addition to gas fuels, but depending on the fuel, there are cases in which problems may occur due to an influence of high-temperature compressed air flowing around a first fuel nozzle.

An object of the present invention is to provide a combustor nozzle, a combustor, and a gas turbine in which movement of a flame upstream toward a distal end portion of a nozzle can be inhibited when flashback occurs and an influence of heat on the fuel can be reduced.

Solution to Problem

According to a first aspect of the present invention, a combustor nozzle includes a nozzle main body extending along an axis, in which the nozzle main body has a first fuel passage which is formed along the axis and through which first fuel is configured to flow, a first fuel ejection passage which extends to an outer circumferential surface of the nozzle main body toward a distal end side thereof from the first fuel passage and is configured to eject the first fuel from the outer circumferential surface, an air flow passage which extends in an axial direction on a radial outer side of the first fuel passage with respect to the axis and through which purge air is configured to flow, and an air ejection passage which extends from the air flow passage toward a center of a distal end of the nozzle main body and is configured to eject purge air from the center of the distal end.

According to such a configuration, the purge air is ejected from a center of a distal end of the nozzle main body, and thereby a fuel concentration of an air-fuel mixture in which fuel and compressed air are mixed can be decreased in the vicinity of the distal end portion of the combustor nozzle in a combustor having a combustor nozzle. Thereby, a flame is not easily generated at the distal end portion of the nozzle. Also, a flow velocity of the air-fuel mixture at the distal end portion of the nozzle is increased by the ejected purge air. Thereby, when flashback occurs, a flame does not easily move upstream toward the distal end portion of the nozzle.

Also, the first fuel passage is disposed on a radial inner side of the air flow passage, and thereby the first fuel can be kept away from the high-temperature compressed air flowing around the nozzle main body to reduce an influence of heat on the first fuel.

In the combustor nozzle described above, the air flow passage may be an annular passage extending in a circumferential direction, and the first fuel passage may be disposed on a radial inner side of the air flow passage.

According to such a configuration, the influence of heat on the first fuel flowing through the first fuel passage can be further reduced. Also, an ejection amount of air can be increased by increasing a flow path cross-sectional area of the air flow passage.

The combustor nozzle described above may further include an air insulation layer provided between the air flow passage and the first fuel passage.

According to such a configuration, the influence of heat on the first fuel flowing through the first fuel passage can be further reduced.

In the combustor nozzle described above, a plurality of first fuel ejection passages may be provided, the air ejection passage may include a plurality of upstream-side air ejection passages connected to the air flow passage, an air cavity connected to downstream sides of the plurality of upstream-side air ejection passages, and a downstream-side air ejection passage connecting the air cavity and the center of the distal end of the nozzle main body, and the first fuel ejection passages and the upstream-side air ejection passages may have different circumferential positions and intersect each other when viewed from a radial direction.

According to such a configuration, purge air can be ejected from the center of the distal end of the nozzle main body without causing interference between the upstream-side air ejection passages and the first fuel ejection passages.

The combustor nozzle described above may further include a second fuel passage through which second fuel is configured to flow on a radial outer side of the first fuel passage, in which the first fuel is oil fuel and the second fuel is gas fuel.

According to such a configuration, the combustor nozzle can be applied to a dual-type combustor that can be switched to oil fuel or gas fuel. Also, coking of oil fuel can be inhibited by disposing the first fuel passage through which oil fuel flows on a radial inner side of the air flow passage.

The combustor described above may further include an air intake part which connects the outer circumferential surface of the nozzle main body and the air flow passage to be configured to take in purge air from the outer circumferential surface of the nozzle main body.

According to such a configuration, purge air can be supplied to the air flow passage at low cost without needing to supply compressed air from the outside.

According to a second aspect of the present invention, a combustor includes a combustor basket which holds the above-described combustor nozzle and in which compressed air is configured to flow toward a downstream side, an outer shell defining a compressed air flow path which is configured to introduce compressed air to be reversed at an end portion of the combustor basket and directed toward the downstream side between the combustor basket and the outer shell, and a turning vane provided on an outer circumferential surface of the nozzle main body and configured to rectify the reversed compressed air, in which an air intake part is formed on an upstream side of the turning vane.

According to such a configuration, compressed air at a higher pressure can be taken into the air intake part as purge air.

In the combustor described above, the air intake part may be formed on a radial outer side with respect to a central axis of the combustor basket.

According to such a configuration, it is possible to efficiently take in the compressed air which is reversed and flows radially inward.

According to a third aspect of the present invention, a combustor includes a combustor basket which holds the above-described combustor nozzle and in which compressed air is configured to flow toward a downstream side, an outer shell defining a compressed air flow path which is configured to introduce compressed air to be reversed at an end portion of the combustor basket and directed toward the downstream side between the combustor basket and the outer shell, an air supply means which is configured to generate compressed air, and an air intake part which is configured to supply the compressed air generated by the air supply means to the air flow passage.

According to such a configuration, purge air can be stably supplied to the air flow passage regardless of an operation state of the gas turbine.

According to a fourth aspect of the present invention, a gas turbine includes a compressor which is configured to generate compressed air in which air is compressed, the combustor described above, and a turbine which is configured to be driven by a combustion gas, in which the air supply means includes an air extraction part which is configured to extract the compressed air generated by the compressor.

According to such a configuration, the compressed air generated by the compressor is extracted, and thereby purge air can be generated without separately providing a device for generating purge air to be supplied to the air flow passage.

Advantageous Effects of Invention

According to the present invention, a flame is not easily generated at the distal end portion of the nozzle, and a flame does not easily move upstream toward the distal end portion of the nozzle when flashback occurs.

Also, the first fuel can be kept away from high-temperature compressed air flowing around the nozzle main body and thus an influence of heat on the first fuel can be reduced.

DESCRIPTION OF EMBODIMENTS

First Embodiment

Hereinafter, a combustor nozzle 1, a combustor 10, and a gas turbine 100 of a first embodiment of the present invention will be described in detail with reference to the drawings.

Figure 1:
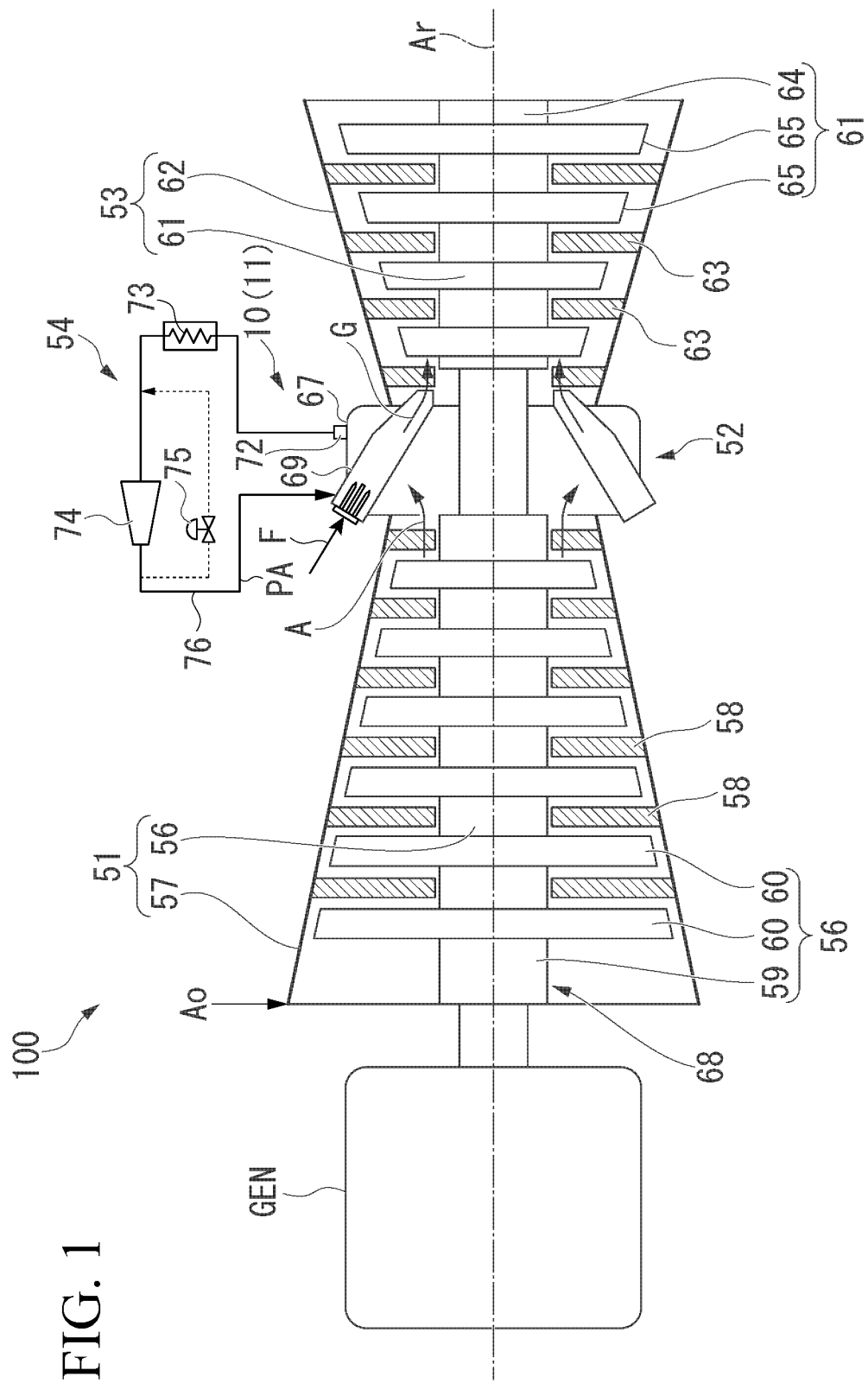
FIG. 1 is a configuration view illustrating a schematic configuration of a gas turbine of a first embodiment of the present invention.

As illustrated in FIG. 1, the gas turbine 100 of the present embodiment includes a compressor 51 which compresses outside air Ao and generates compressed air A, a plurality of combustors 10 which burn an air-fuel mixture of the compressed air A and fuel F and generate a combustion gas G, a turbine 53 driven by the combustion gas G, and a cooling device 54 which cools an object to be cooled of the gas turbine 100.

The compressor 51 includes a compressor rotor 56 which rotates around a gas turbine axis Ar, a compressor casing 57 which rotatably covers the compressor rotor 56, and a plurality of compressor vane rows 58.

The compressor rotor 56 includes a compressor rotor shaft 59 extending along the gas turbine axis Ar, and a plurality of compressor blade rows 60 attached to the compressor rotor shaft 59. The plurality of compressor blade rows 60 are aligned in an axial direction of the gas turbine axis Ar. Each of the compressor blade rows 60 is constituted of a plurality of blades aligned in a circumferential direction around the gas turbine axis Ar. The compressor vane rows 58 are respectively disposed on downstream sides of the plurality of compressor blade rows 60. All of the compressor vane rows 58 are fixed inside the compressor casing 57. Each of the compressor vane rows 58 is constituted of a plurality of vanes aligned in the circumferential direction around the gas turbine axis Ar.

The turbine 53 includes a turbine rotor 61 which rotates around the gas turbine axis Ar, a turbine casing 62 which rotatably covers the turbine rotor 61, and a plurality of turbine vane rows 63. The turbine rotor 61 includes a turbine rotor shaft 64 extending along the gas turbine axis Ar, and a plurality of turbine blade rows 65 attached to the turbine rotor shaft 64.

The plurality of turbine blade rows 65 are aligned in the axial direction of the gas turbine axis Ar. Each of the plurality of turbine blade rows 65 is constituted of a plurality of blades aligned in the circumferential direction around the gas turbine axis Ar. The turbine vane rows 63 are respectively disposed on upstream sides of the plurality of turbine blade rows 65. All of the turbine vane rows 63 are fixed inside the turbine casing 62. Each of the turbine vane rows 63 is constituted of a plurality of vanes aligned in the circumferential direction around the gas turbine axis Ar.

The gas turbine 100 further includes a cylindrical intermediate casing 67 with the gas turbine axis Ar as a center. The intermediate casing 67 is disposed between the compressor casing 57 and the turbine casing 62 in the axial direction of the gas turbine axis Ar. The compressor rotor 56 and the turbine rotor 61 are positioned on the same gas turbine axis Ar and connected to each other to form a gas turbine rotor 68. For example, a rotor of a generator GEN may be connected to the gas turbine rotor 68.

The combustor 10 generates the combustion gas G at high temperature and high pressure by supplying the fuel F to the compressed air A compressed by the compressor 51. The combustor 10 of the present embodiment is a dual-type combustor that can be switched to oil fuel or gas fuel.

The plurality of combustors 10 are fixed to the intermediate casing 67 at intervals in the circumferential direction around the gas turbine axis Ar. The combustor 10 includes a combustor main body 11 and a combustor liner 69. The combustor liner 69 functions as a combustion chamber for reacting the supplied fuel F with the compressed air A. The combustor liner 69 accelerates a flow velocity of the combustion gas G introduced from the combustor main body 11 and introduces it into the downstream turbine 53.

The outside air Ao taken into the compressor 51 is compressed by passing through the plurality of compressor vane rows 58 and compressor blade rows 60 and then becomes the compressed air A at high temperature and high pressure. The fuel F is mixed with the compressed air A and burned in the combustor 10, and thereby the combustion gas G at high temperature and high pressure is generated. Then, the turbine rotor shaft 64 is rotationally driven by the combustion gas G passing through the turbine vane rows 63 and the turbine blade rows 65 of the turbine 53, and rotational power is applied to the generator GEN connected to the gas turbine rotor 68 to perform power generation.

The cooling device 54 is a device that extracts a portion of the compressed air A supplied to the combustor 10 and compresses it again to cool an object to be cooled of the gas turbine 100. The object to be cooled is a component that is exposed to a high temperature.

The cooling device 54 includes an air extraction part 72 which extracts a portion of the compressed air A, a cooler 73 which cools the extracted compressed air A, a forced air-cooling compressor 74 which further compresses the compressed air A cooled by the cooler 73 into purge air PA, an anti-surge valve 75 for preventing a surge of the forced air-cooling compressor 74, and an air introduction part 76 which introduces the purge air PA into a first fuel nozzle 1 (see FIG. 2) of the combustor 10.

Figure 2:
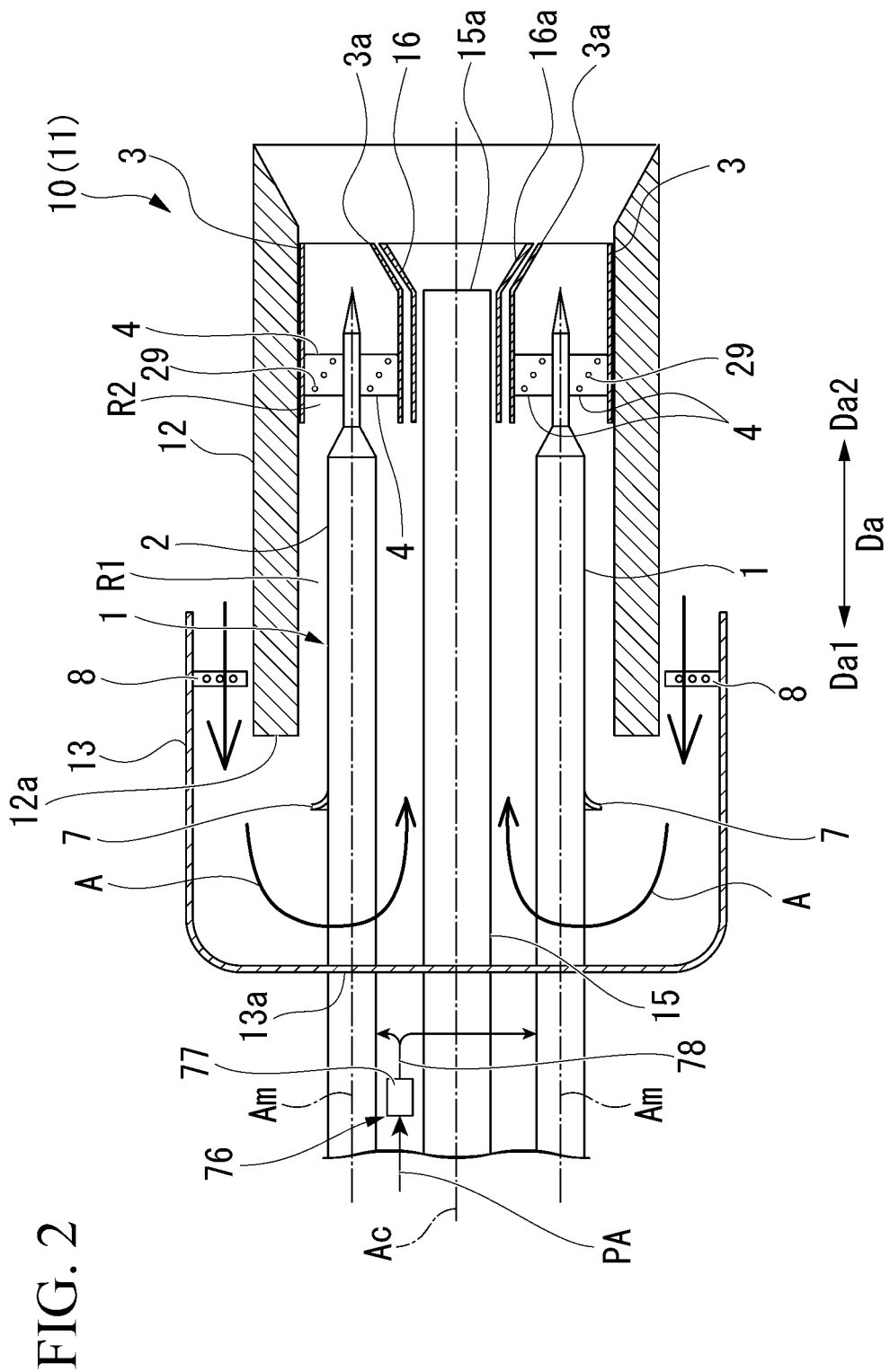
FIG. 2 is a configuration view illustrating a schematic configuration of a combustor of the first embodiment of the present invention.

As illustrated in FIG. 2, the air introduction part 76 includes a manifold 77 and an air introduction pipe 78. The air introduction pipe 78 is connected to an air flow passage 24 of the first fuel nozzle 1 (see FIG. 3).

The compressed air A compressed again by the forced air-cooling compressor 74 is supplied as the purge air PA to the first fuel nozzle 1 via the air introduction part 76. The purge air PA may be supplied as cooling air to other objects to be cooled of the gas turbine 100 such as, for example, the vanes.

As illustrated in FIG. 2, the combustor main body 11 includes a cylindrical combustor basket 12 and an outer shell 13 provided on an outer circumferential side of the combustor basket 12 coaxially with a central axis Ac of the combustor basket 12. A compressed air flow path R1 that introduces the compressed air A to be reversed at an end portion 12a of the combustor basket 12 and directed toward a downstream side Da2 is formed between the outer shell 13 and the combustor basket 12.

The compressed air A introduced into the combustor main body 11 from between the outer shell 13 and the combustor basket 12 is rotated by 180° at an end wall 13a of the outer shell 13 and supplied to the inside of the combustor basket 12.

The combustor main body 11 includes a second fuel nozzle 15 and the first fuel nozzle 1 in the combustor basket 12.

A third fuel nozzle 8 for injecting fuel into the compressed air flow path R1 is provided on an inner circumferential surface of the outer shell 13. The third fuel nozzle 8 is formed to protrude from the inner circumferential surface of the outer shell 13 toward the central axis Ac of the combustor basket 12. The third fuel nozzle 8 is connected to a fuel supply source (not illustrated). The fuel is mixed with the compressed air A in the compressed air flow path R1.

The second fuel nozzle 15 is provided along the central axis Ac of the combustor basket 12. The second fuel nozzle 15 injects the fuel F supplied from the outside from a distal end side thereof to generate a flame when the fuel F is ignited. The second fuel nozzle 15 includes a pilot cone 16. The pilot cone 16 is formed in a cylindrical shape surrounding an outer circumferential side of a distal end portion 15a of the second fuel nozzle 15. The pilot cone 16 includes a tapered cone portion 16a whose inner diameter gradually expands toward a flame generation direction from the vicinity of the distal end portion 15a of the second fuel nozzle 15. The tapered cone portion 16a regulates a diffusion range and a direction of flame and enhances a flame holding property.

A plurality of first fuel nozzles 1 are provided in the combustor basket 12. These first fuel nozzles 1 are disposed on an outer circumferential side of the second fuel nozzle 15 (on a radial outer side with respect to the central axis Ac) at intervals in the circumferential direction. Each of the first fuel nozzles 1 extends parallel to the central axis Ac of the combustor basket 12.

The first fuel nozzle 1 includes a first fuel nozzle main body 2, a cone member 3, and a swirl vane 4 provided between the first fuel nozzle main body 2 and the cone member 3.

In the following description, a direction in which an axis Am of the first fuel nozzle 1 extends is referred to as an axial direction Da. Also, a direction perpendicular to the axis Am is referred to as a radial direction, a side away from the axis Am in the radial direction is referred to as a radial outer side, and a side closer to the axis Am in the radial direction is referred to as a radial inner side. Further, in the axial direction Da, a base end side of the first fuel nozzle 1 is referred to as an upstream side Da1 (left side in FIG. 2), and a distal end side of the first fuel nozzle 1 is referred to as a downstream side Da2 (right side in FIG. 2).

The first fuel nozzle main body 2 is a substantially columnar member extending along the axis Am. The first fuel nozzle main body 2 includes a first fuel nozzle base portion 2a on the upstream side Da1, a first fuel nozzle distal end portion 2c on the downstream side Da2, and a first fuel nozzle tapered portion 2b connecting the first fuel nozzle base portion 2a and the first fuel nozzle distal end portion 2c. An outer diameter of the first fuel nozzle base portion 2a is larger than an outer diameter of the first fuel nozzle distal end portion 2c.

The first fuel nozzle tapered portion 2b is formed to gradually decrease in diameter toward the downstream side Da2 to smoothly connect the first fuel nozzle base portion 2a and the first fuel nozzle distal end portion 2c. The first fuel nozzle distal end portion 2c has substantially a conical shape in which an outer diameter thereof gradually decreases toward the downstream side Da2.

A plurality of first fuel ejection holes 23 (see FIG. 3) for ejecting oil fuel are formed at the first fuel nozzle distal end portion 2c. An air ejection hole 26 for ejecting air is formed at a center of a distal end of the first fuel nozzle distal end portion 2c.

The cone member 3 is provided on an outer circumferential side of the first fuel nozzle distal end portion 2c. The cone member 3 is cylindrical and provided to surround the first fuel nozzle distal end portion 2c of the first fuel nozzle main body 2 from an outer circumferential side. The cone member 3 is formed such that a side 3a close to the pilot cone 16 on a center side of the combustor basket 12 is gradually inclined to the outer circumferential side toward the flame generation direction. The cone member 3 forms a main flow path R2 through which the compressed air A flows between the cone member 3 and the first fuel nozzle 1.

A plurality of swirl vanes 4 apply a swirling force to a flow in the main flow path R2. A plurality of second fuel ejection holes 29 for ejecting gas fuel F2 are formed in the plurality of swirl vanes 4. Oil fuel F1 or the gas fuel F2 is supplied into the first fuel nozzle 1, and the gas fuel F2 is supplied from the first fuel nozzle 1 to the swirl vanes 4.

Each of the swirl vanes 4 protrudes in the radial direction from an outer circumferential surface of the first fuel nozzle 1 and is connected to an inner circumferential surface of the cone member 3. The swirl vane 4 is formed to swirl the compressed air A flowing to the downstream side Da2 around the axis Am.

Figure 3:
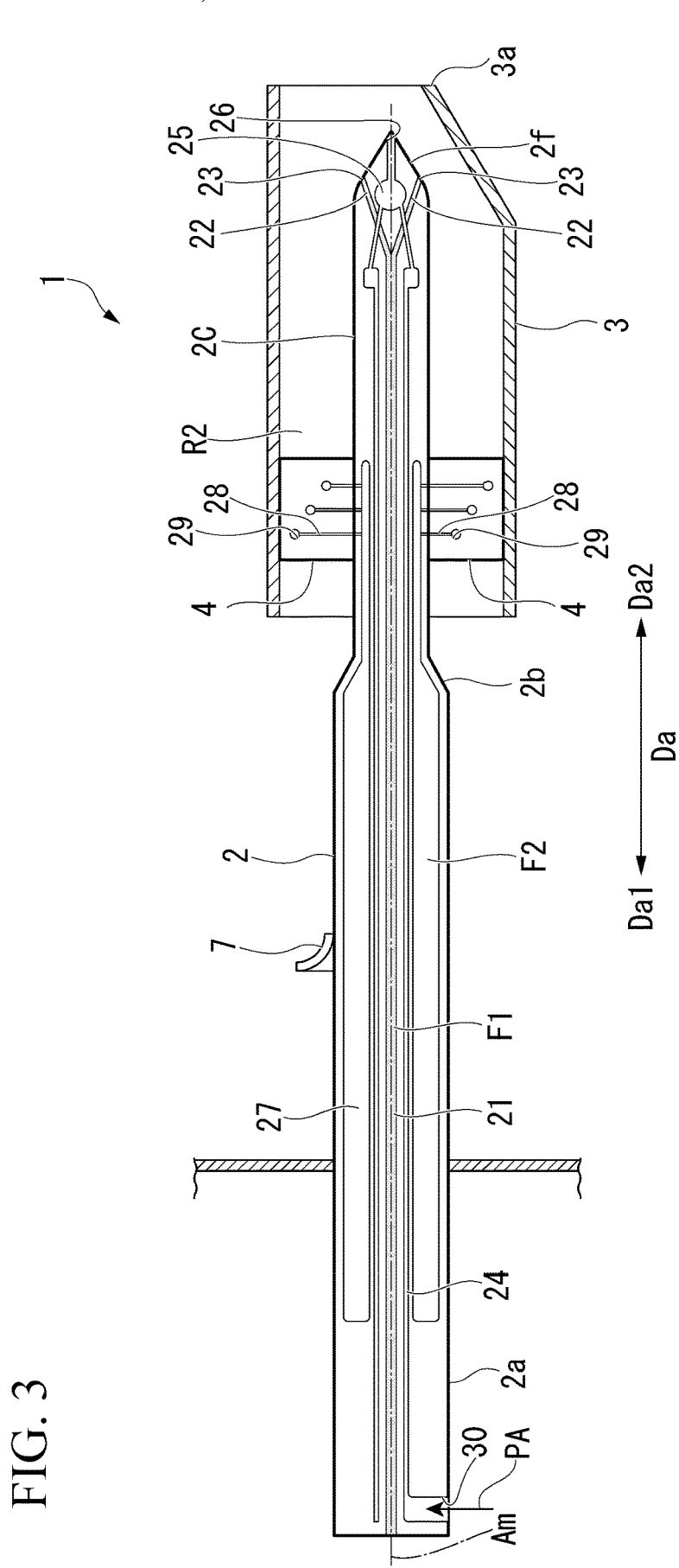
FIG. 3 is a cross-sectional view of a first fuel nozzle of the first embodiment of the present invention.

As illustrated in FIG. 3, the first fuel nozzle main body 2 includes a first fuel passage 21 into which the oil fuel F1, which is a first fuel, is introduced, three first fuel ejection passages 22 (only two are illustrated in FIG. 3) connected to the downstream side Da2 of the first fuel passage 21, the air flow passage 24 into which the purge air PA is introduced, an air ejection passage 25 connected to the downstream side Da2 of the air flow passage 24, a second fuel passage 27 into which the gas fuel F2, which is a second fuel, is introduced, and a second fuel ejection passage 28 connecting the second fuel passage 27 to the second fuel ejection hole 29.

The first fuel passage 21 is formed along the axis Am at a center position in the radial direction of the first fuel nozzle main body 2. The first fuel passage 21 is disposed on the axis Am of the first fuel nozzle main body 2.

The first fuel ejection passages 22 extend to an outer circumferential surface 2f of the first fuel nozzle main body 2 toward the distal end side of the first fuel nozzle main body 2. The first fuel ejection passages 22 are connected to the first fuel ejection holes 23 that open on the outer circumferential surface 2f of the first fuel nozzle main body 2. The oil fuel F1 as the first fuel flows through the first fuel passage 21.

The three first fuel ejection passages 22 are provided at regular intervals in the circumferential direction around the axis Am. Each of the first fuel ejection passages 22 is gradually inclined radially outward toward the downstream side Da2.

The oil fuel F1 supplied to the first fuel passage 21 is divided into the three first fuel ejection passages 22 and ejected from the first fuel ejection holes 23. Further, the number of first fuel ejection passages 22 is not limited to three.

The air flow passage 24 is an annular passage disposed on a radial outer side of the first fuel passage 21 and extending in the axial direction Da. The air flow passage 24 has an annular cross-sectional shape when viewed in the axial direction Da. The air flow passage 24 extends from the first fuel nozzle base portion 2a to the first fuel nozzle distal end portion 2c of the first fuel nozzle main body 2.

In the vicinity of an end portion on the upstream side Da1 of the first fuel nozzle base portion 2a, an air introduction hole 30 connecting the air flow passage 24 and an outer circumferential surface of the first fuel nozzle main body 2 is formed. The air introduction hole 30 extends from the air flow passage 24 toward the central axis Ac (see FIG. 2) of the combustor basket 12 of the combustor 10. The purge air PA is supplied to the air flow passage 24 via the air introduction part 76 of the cooling device 54 and the air introduction hole 30.

Figure 4:
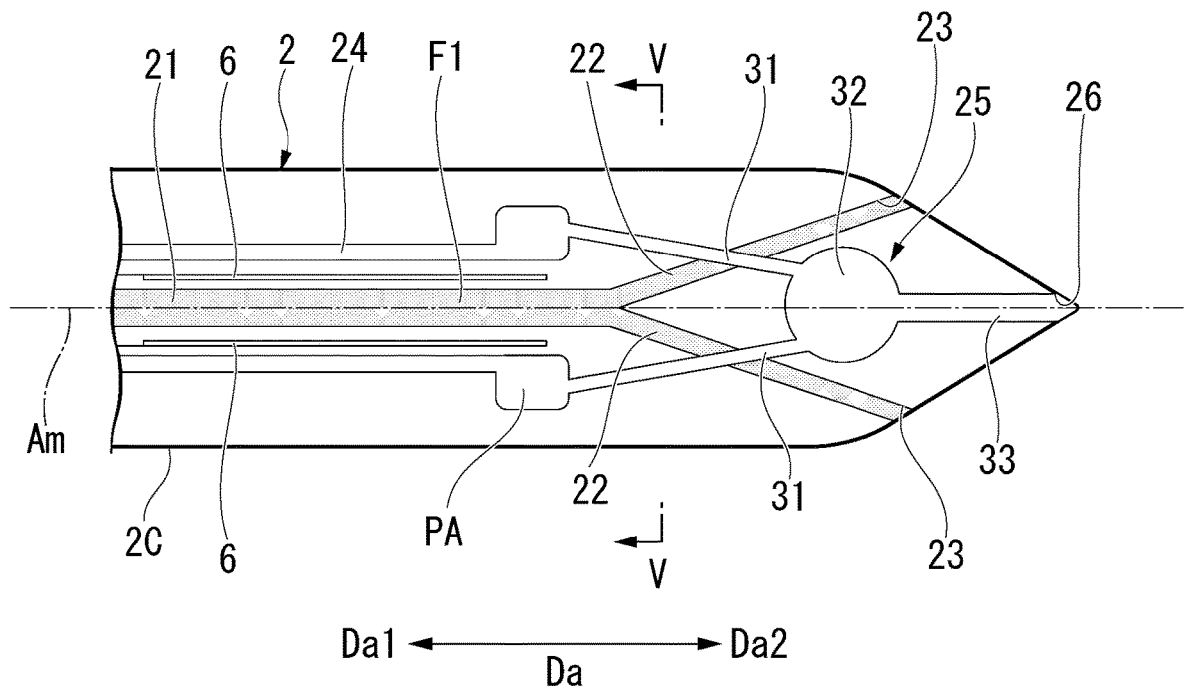
FIG. 4 is a cross-sectional view of a distal end portion of the first fuel nozzle of the first embodiment of the present invention.

The air ejection passage 25 is a flow path connecting the air flow passage 24 and the air ejection hole 26. As illustrated in FIG. 4, the air ejection passage 25 includes three upstream-side air ejection passages 31 (only two are illustrated in FIG. 4) connected to the air flow passage 24, an air cavity 32 connected to the downstream side Da2 of the three upstream-side air ejection passages 31, and a downstream-side air ejection passage 33 connecting the air cavity 32 and the air ejection hole 26.

The three upstream-side air ejection passages 31 are provided at regular intervals in the circumferential direction around the axis Am. Each of the upstream-side air ejection passages 31 is formed along the outer circumferential surface of the first fuel nozzle main body 2. The upstream-side air ejection passage 31 intersects the first fuel ejection passage 22 when viewed in the radial direction.

The air cavity 32 is a space formed on the upstream side Da1 of the first fuel ejection hole 23. The downstream-side air ejection passage 33 is formed on the axis Am.

Figure 5:
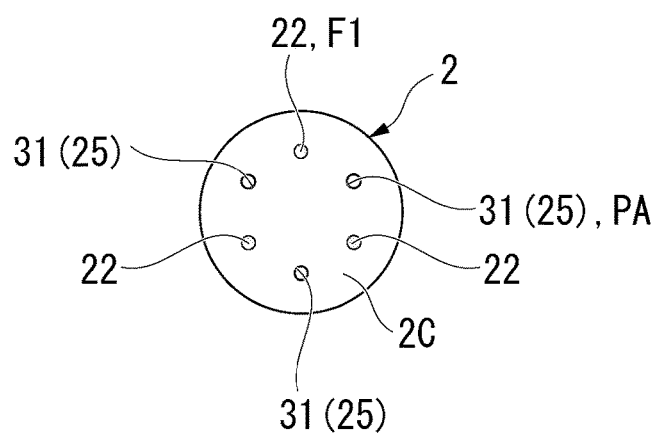
FIG. 5 is a cross-sectional view taken along line V-V of FIG. 4 for explaining a disposition of a first fuel ejection passage and an upstream-side air ejection passage of the first fuel nozzle.
Figure 6:
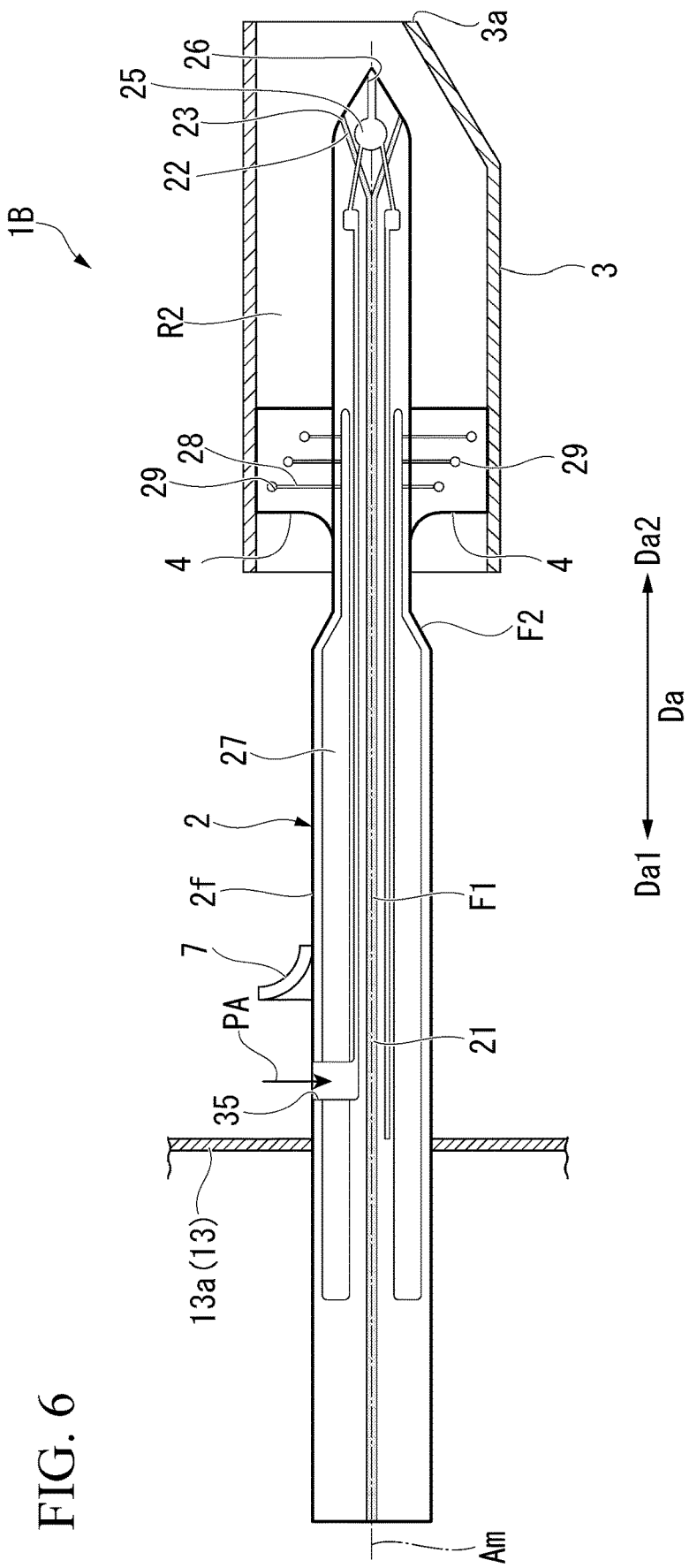
FIG. 6 is a cross-sectional view of a first fuel nozzle of a second embodiment of the present invention.

As illustrated in FIG. 5, the first fuel ejection passages 22 and the upstream-side air ejection passages 31 are alternately formed at intervals in the circumferential direction. That is, the first fuel ejection passages 22 and the upstream-side air ejection passages 31 are formed such that the first fuel ejection passages 22 and the upstream-side air ejection passages 31 are respectively adjacent to each other. By disposing the first fuel ejection passages 22 and the upstream-side air ejection passages 31 in this manner, even when these are made to intersect each other when viewed from the radial direction, these can be disposed in a well-balanced manner.

As illustrated in FIG. 3, the second fuel passage 27 is disposed on a radial outer side of the air flow passage 24. The second fuel passage 27 extends from the first fuel nozzle base portion 2a to the first fuel nozzle distal end portion 2c. Although the second fuel passage 27 is a flow path formed in an annular shape, those divided into a plurality of flow paths in the radial direction may also be used.

A turning vane 7 is provided on the outer circumferential surface of the first fuel nozzle main body 2. The turning vane 7 rectifies the compressed air A (see FIG. 2) which has been rotated by 180° at the end wall 13a of the outer shell 13 and supplied to the inside of the combustor basket 12. The turning vane 7 is disposed on the upstream side Da1 of the end portion on the upstream side Da1 of the combustor basket 12 and on the downstream side Da2 of the end wall 13a of the outer shell 13.

As illustrated in FIG. 4, an air insulation layer 6 is formed between the first fuel passage 21 and the air flow passage 24. The air insulation layer 6 is an annular space extending in the axial direction Da.

Next, operations and actions of the gas turbine 100 of the present embodiment will be described.

The compressor 51 suctions the outside air Ao and compresses it. The air compressed by the compressor 51 is guided to the first fuel nozzle 1 and the second fuel nozzle 15 of the combustor 10. The fuel F is supplied to the first fuel nozzle 1 and the second fuel nozzle 15. The first fuel nozzle 1 ejects an air-fuel mixture in which the fuel F and the compressed air A are mixed into the combustor main body 11. This air-fuel mixture is subjected to premixed combustion in the combustor main body 11.

The second fuel nozzle 15 ejects the fuel F and the compressed air A into the combustor main body 11, respectively. The fuel F is subjected to diffusion combustion or premixed combustion in the combustor main body 11. The combustion gas G at high temperature and high pressure generated by combustion of the fuel F in the combustor main body 11 is guided by a transition piece 70 into a combustion gas flow path of the turbine 53 to rotate the turbine rotor 61.

Air compressed by the compressor 51 is introduced to the cone member 3 from an upstream end thereof. The compressed air A swirls around the axis Am due to the plurality of swirl vanes 4 of the first fuel nozzle 1. The gas fuel F2 is injected into the cone member 3 from the second fuel ejection holes 29 of the plurality of swirl vanes 4. In an oil-burning operation, the oil fuel F1 is ejected from the first fuel ejection holes 23 into the combustor main body 11.

The gas fuel F2 ejected from the second fuel ejection holes 29 of the swirl vanes 4 and the compressed air A flowing to the downstream side Da2 while swirling are premixed in the cone member 3 and then ejected as an air-fuel mixture from a downstream end of the cone member 3 into the combustor main body 11.

The gas fuel F2 ejected from the second fuel ejection holes 29 of the plurality of swirl vanes 4 into the combustor main body 11 is promoted to be mixed with the compressed air A by a swirling flow formed by the plurality of swirl vanes 4. Also, since the air-fuel mixture is ejected into the combustor main body 11 while swirling from the cone member 3, flame holding effects of a premixed flame formed by the combustion of the air-fuel mixture is enhanced.

The purge air generated by the cooling device 54 is introduced into the air flow passage 24 via the air introduction part 76. The purge air PA introduced into the air flow passage 24 is ejected from the air ejection hole 26 via the air ejection passage 25. Thereby, a fuel concentration of the air-fuel mixture in which the fuel F and the compressed air A are mixed decreases in the vicinity of a distal end portion of the first fuel nozzle 1. Also, a flow velocity of the air-fuel mixture at the distal end portion of the first fuel nozzle 1 is increased by the ejected purge air PA.

According to the above-described embodiment, the purge air PA is ejected from a center of the distal end of the first fuel nozzle main body 2, and thereby a fuel concentration of the air-fuel mixture in which the fuel F and the compressed air A are mixed can be decreased in the vicinity of the distal end portion of the first fuel nozzle 1. Thereby, a flame is not easily generated at the distal end portion of the first fuel nozzle 1. Also, a flow velocity of the air-fuel mixture at the distal end portion of the first fuel nozzle 1 is increased by the ejected purge air PA. Thereby, when flashback occurs, a flame does not easily move upstream toward the distal end portion of the first fuel nozzle 1.

Also, the first fuel passage 21 is disposed on a radial inner side of the air flow passage 24, and thereby the oil fuel F1 can be kept away from the high-temperature compressed air A flowing around the first fuel nozzle main body 2 and an influence of heat (coking) on the oil fuel F1 can be reduced.

Also, the air flow passage 24 is formed into an annular passage and the first fuel passage 21 is disposed on a radial inner side of the air flow passage 24, and thereby the influence of heat on the oil fuel F1 can be further reduced. Further, an ejection amount of the purge air PA can be increased by increasing a flow path cross-sectional area of the air flow passage 24.

Also, the air insulation layer 6 is provided between the air flow passage 24 and the first fuel passage 21, and thereby the influence of heat on the oil fuel F1 can be further reduced.

Also, the first fuel ejection passages 22 and the upstream-side air ejection passages 31 have different circumferential positions and intersect each other when viewed from the radial direction, and thereby the purge air PA can be ejected from the center of the distal end of the first fuel nozzle 1 without causing interference between the upstream-side air ejection passages 31 and the first fuel ejection passages 22.

Also, the purge air PA is generated using the cooling device 54 serving as an air supply means, and thereby the purge air PA can be stably supplied to the air flow passage 24 regardless of an operation state of the gas turbine 100.

Also, the cooling device 54 having the air extraction part 72 for extracting the compressed air A generated by the compressor 51 is used, and thereby air can be generated without separately providing a device for generating the purge air PA to be supplied to the air flow passage 24.

Further, in the embodiment described above, although the cooling device 54 is used as a device for generating the purge air PA, the present invention is not limited thereto, and for example, a configuration in which a compressor is separately prepared to supply the purge air PA may be employed.

Second Embodiment

Hereinafter, a combustor nozzle 1B, a combustor 10, and a gas turbine 100 of a second embodiment of the present invention will be described in detail with reference to the drawings. The present embodiment will be described mainly focusing on differences from the first embodiment described above, and description on similar portions will be omitted.

The first fuel nozzle 1B of the present embodiment differs from the first fuel nozzle 1 of the first embodiment in a supply source of purge air PA ejected from an air ejection hole 26. While the first fuel nozzle 1 of the first embodiment injects the purge air PA supplied from the cooling device 54, in the first fuel nozzle 1B of the present embodiment, a compressed air A flowing through a compressed air flow path R1 is directly introduced into the air flow passage 24.

An air intake port 35 (air intake part) is formed in a first fuel nozzle main body 2 of the first fuel nozzle 1B of the present embodiment as alternatives to the air introduction hole 30 of the first embodiment. The air intake port 35 is formed on an outer circumferential surface 2f of the first fuel nozzle main body 2. The air intake port 35 is formed on an upstream side Da1 of a turning vane 7 and on a downstream side Da2 of an end wall 13a of an outer shell 13.

Also, the air intake port 35 is formed on a radial outer side with respect to a central axis Ac of a combustor basket 12 (see FIG. 2). In other words, the air intake port 35 opens radially outward with respect to a central axis Ac of the combustor basket 12.

According to the above-described embodiment, the purge air PA can be supplied to the air flow passage 24 at low cost without needing to supply compressed air A from the outside.

Also, the air intake port 35 is formed on the upstream side Da1 of the turning vane 7, and thereby air at a higher pressure can be taken into the air intake port 35.

Further, the air intake port 35 is formed on a radial outer side with respect to the central axis Ac of the combustor basket 12, and thereby the air intake port 35 can efficiently take in the compressed air A which is reversed to flow radially inward.

Further, the air intake port 35 does not have to be formed on a radial outer side with respect to the central axis Ac of the combustor basket 12 and may be formed on a radial inner side with respect to the central axis Ac of the combustor basket 12.

Also, the air intake port 35 can be inclined, for example, toward the upstream side Da1 or the downstream side Da2 to enhance an efficiency of taking in the compressed air A.

While embodiments of the present invention have been described in detail as above with reference to the accompanying drawings, the specific configurations are not limited to the embodiments but may include design changes or the like without departing from the spirit of the present invention.

Further, in the above-described embodiment, although the air flow passage 24 has an annular shape, the present invention is not limited thereto. For example, a plurality of airflow passages 24 may be formed and disposed at intervals in the circumferential direction.

Further, in the above-described embodiment, although the combustor 10 is a dual-type combustor that can be switched to the oil fuel F1 or the gas fuel F2, the present invention is not limited thereto and can be applied to a combustor using only gas fuel.

REFERENCE SIGNS LIST

1 First fuel nozzle (combustor nozzle)
2 First fuel nozzle main body (nozzle main body)
2a First fuel nozzle base portion
2b First fuel nozzle tapered portion
2c First fuel nozzle distal end portion
3 Cone member
4 Swirl vane
6 Air insulation layer
7 Turning vane
8 Third fuel nozzle
10 Combustor
11 Combustor main body
12 Combustor basket
13 Outer shell
13a End wall
15 Second fuel nozzle
16 Pilot cone
21 First fuel passage
22 First fuel ejection passage
23 First fuel ejection hole
24 Air flow passage
25 Air ejection passage
26 Air ejection hole
27 Second fuel passage
28 Second fuel ejection passage
29 Second fuel ejection hole
30 Air introduction hole
31 Upstream-side air ejection passage
32 Air cavity
33 Downstream-side air ejection passage
35 Air intake port
51 Compressor
53 Turbine
54 Cooling device
72 Air extraction part
73 Cooler
74 Forced air-cooling compressor
75 Anti-surge valve
76 Air introduction part
78 Air introduction pipe
100 Gas turbine
A Compressed air
Ac Axis
Am Axis
Ar Axis
Da Axial direction
Da1 Upstream side
Da2 Downstream side
G Combustion gas
PA Purge air
R1 Compressed air flow path
R2 Main flow path

The invention claimed is:

1. A combustor nozzle comprising:
a nozzle main body extending along an axis,
wherein the nozzle main body includes:
a first fuel passage which extends along the axis and through which first fuel is configured to flow;
a plurality of first fuel ejection passages which extend to an outer circumferential surface of the nozzle main body toward a distal end side thereof from the first fuel passage and are configured to eject the first fuel from the outer circumferential surface of the nozzle main body;
an air flow passage which extends in an axial direction on a radial outer side of the first fuel passage with respect to the axis and through which purge air is configured to flow; and
an air ejection passage which extends from the air flow passage toward a center of a distal end of the nozzle main body and is configured to eject the purge air from the center of the distal end of the nozzle main body, and
wherein the air ejection passage includes:
a plurality of upstream-side air ejection passages connected to the air flow passage;
an air cavity connected to downstream sides of the plurality of upstream-side air ejection passages; and
a downstream-side air ejection passage connecting the air cavity and the center of the distal end of the nozzle main body, the plurality of first fuel ejection passages and the plurality of upstream-side air ejection passages having different circumferential positions with respect to the axis and intersecting each other when viewed from a radial direction with respect to the axis.

2. The combustor nozzle according to claim 1, wherein:
the air flow passage is an annular passage extending in a circumferential direction with respect to the axis; and
the first fuel passage is on a radial inner side of the air flow passage with respect to the axis.

3. The combustor nozzle according to claim 1, further comprising an air insulation layer between the air flow passage and the first fuel passage.

4. The combustor nozzle according to claim 1, wherein:
the nozzle main body includes a second fuel passage through which second fuel is configured to flow on the radial outer side of the first fuel passage with respect to the axis; and
the first fuel is oil fuel and the second fuel is gas fuel.

5. The combustor nozzle according to claim 1, wherein the nozzle main body includes an air intake part which connects the outer circumferential surface of the nozzle main body and the air flow passage and is configured to take in the purge air from the outer circumferential surface of the nozzle main body.

6. The combustor nozzle according to claim 5, further comprising a turning vane on the outer circumferential surface of the nozzle main body,
wherein the air intake part is defined in the nozzle main body on an upstream side of the turning vane.

7. A combustor comprising:
the combustor nozzle according to claim 5;
a combustor basket which holds the combustor nozzle and in which compressed air is configured to flow toward a downstream side; and
an outer shell defining a compressed air flow path which is configured to introduce the compressed air so as to be reversed at an end portion of the combustor basket and directed toward the downstream side between the combustor basket and the outer shell,
wherein:
the combustor nozzle includes a turning vane on the outer circumferential surface of the nozzle main body, the turning vane being configured to rectify the compressed air which has been reversed; and
the air intake part is defined in the nozzle main body on an upstream side of the turning vane.

8. The combustor according to claim 7, wherein the air intake part is defined in the nozzle main body at a portion on a radial outer side with respect to a central axis of the combustor basket.

9. A combustor comprising:
the combustor nozzle according to claim 1;
a combustor basket which holds the combustor nozzle and in which compressed air is configured to flow toward a downstream side;
an outer shell defining a compressed air flow path which is configured to introduce the compressed air so as to be reversed at an end portion of the combustor basket and directed toward the downstream side between the combustor basket and the outer shell; and
an air intake part which is configured to supply the compressed air to the air flow passage.

10. A gas turbine comprising:
the combustor according to claim 9;
a compressor which is configured to generate compressed air in which air is compressed;
a turbine which is configured to be driven by a combustion gas generated by the combustor; and
an air supplier which is configured to generate compressed air,
wherein:
the air supplier includes an air extraction part which is configured to extract the compressed air generated by the compressor; and
the air intake part is configured to supply the compressed air generated by the air supplier to the air flow passage.

11. A combustor comprising:
a combustor basket which is cylindrical with a central axis as a center and in which compressed air is configured to flow toward a downstream side;
an outer shell which covers an end portion on an upstream side of the combustor basket; and
a combustor nozzle in the combustor basket,
wherein:

the outer shell defines a compressed air flow path which is configured to introduce the compressed air into the combustor basket between the outer shell and the combustor basket;
the compressed air flow path is configured to receive compressed air from the upstream side, reverse a flow of the compressed air to the downstream side at the end portion on the upstream side of the combustor basket, and then introduce the compressed air into the combustor basket;
the combustor nozzle includes a nozzle main body extending along an axis,
the nozzle main body includes:
a fuel passage which extends along the axis and through which fuel is configured to flow;
a plurality of fuel ejection passages which extend to an outer circumferential surface of the nozzle main body toward a distal end side thereof from the fuel passage and are configured to eject the fuel from the outer circumferential surface of the nozzle main body;
an air flow passage which extends in an axial direction in which the axis extends and through which purge air is configured to flow;
an air ejection passage which extends from the air flow passage toward a center of a distal end of the nozzle main body and is configured to eject the purge air from the center of the distal end of the nozzle main body; and
an air intake part which connects the outer circumferential surface of the nozzle main body and the air flow passage and is configured to take in the purge air from the outer circumferential surface of the nozzle main body, and
wherein:
the air intake part is defined in the nozzle main body at a portion on a radial outer side with respect to the central axis of the combustor basket; and
the air ejection passage includes:
a plurality of upstream-side air ejection passages connected to the air flow passage;
an air cavity connected to downstream sides of the plurality of upstream-side air ejection passages; and
a downstream-side air ejection passage connecting the air cavity and the center of the distal end of the nozzle main body, the plurality of fuel ejection passages and the plurality of upstream-side air ejection passages having different circumferential positions with respect to the axis and intersecting each other when viewed from a radial direction with respect to the axis.

12. The combustor according to claim 11, wherein:
the combustor nozzle includes a turning vane on the outer circumferential surface of the nozzle main body, the turning vane being configured to rectify the compressed air which has been reversed; and
the air intake part is defined in the nozzle main body on the upstream side of the turning vane.

13. A combustor comprising:
a combustor basket which is cylindrical with a central basket axis as a center and in which compressed air is configured to flow toward a downstream side;
an outer shell which covers an end portion on an upstream side of the combustor basket;
a first fuel nozzle in the combustor basket; and
a second fuel nozzle,
wherein:

the outer shell defines a compressed air flow path which is configured to introduce the compressed air into the combustor basket between the outer shell and the combustor basket;

the compressed air flow path is configured to receive compressed air from the upstream side, reverse a flow of the compressed air to the downstream side at the end portion on the upstream side of the combustor basket, and then introduce the compressed air into the combustor basket; and the first fuel nozzle includes a nozzle main body extending along an axis, wherein the nozzle main body includes:

a fuel passage which extends along the axis and through which fuel is configured to flow;

a fuel ejection passage which is configured to eject the fuel;

an air flow passage which extends in an axial direction in which the axis extends and through which purge air is configured to flow;

an air ejection passage which extends from the air flow passage toward a center of a distal end of the nozzle main body and is configured to eject the purge air from the center of the distal end of the nozzle main body; and an air intake part which connects an outer circumferential surface of the nozzle main body and the air flow passage and is configured to take in the purge air from the outer circumferential surface of the nozzle main body, and wherein:

the first fuel nozzle is on a radial outer side with respect to a nozzle central axis of the second fuel nozzle and is at a first position in a circumferential direction with respect to the nozzle central axis; and the air intake part is defined in a portion of the nozzle main body in a first direction from the nozzle central axis toward the first position and defined only at a portion on a radial outer side with respect to the central basket axis, and not defined at a portion on a radial inner side with respect to the central basket axis.

\* \* \* \* \*